US011200185B2

(12) United States Patent
Berke et al.

(10) Patent No.: US 11,200,185 B2
(45) Date of Patent: Dec. 14, 2021

(54) SYSTEM AND METHOD OF REROUTING AN INTER-PROCESSOR COMMUNICATION LINK BASED ON A LINK UTILIZATION VALUE

(71) Applicant: Dell Products L.P., Round Rock, TX (US)

(72) Inventors: Stuart Allen Berke, Austin, TX (US); Wade Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 16/905,627

(22) Filed: Jun. 18, 2020

(65) Prior Publication Data
US 2020/0320029 A1    Oct. 8, 2020

Related U.S. Application Data

(63) Continuation of application No. 16/271,014, filed on Feb. 8, 2019, now Pat. No. 10,725,946.

(51) Int. Cl.
*G06F 13/26* (2006.01)
*G06F 13/42* (2006.01)

(52) U.S. Cl.
CPC .......... *G06F 13/26* (2013.01); *G06F 13/4282* (2013.01); *G06F 2213/0026* (2013.01)

(58) Field of Classification Search
CPC ..... G06F 2213/2424; G06F 2213/2422; G06F 2213/2418; G06F 2213/2414;
(Continued)

(56) References Cited

U.S. PATENT DOCUMENTS 9,086,974 B2    7/2015 Busaba et al.
10,725,946 B1 *  7/2020 Berke ................. G06F 13/4282
(Continued)

OTHER PUBLICATIONS

Lozi, Jean-Pierre, et al. "The Linux scheduler: a decade of wasted cores." *Proceedings of the Eleventh European Conference on Computer Systems*. ACM, 2016; 16 pages, 2016

*Primary Examiner* — Raymond N Phan
(74) *Attorney, Agent, or Firm* — Baker Botts L.L.P.

(57) ABSTRACT

In one or more embodiments, one or more systems, methods, and/or processes may configure multiple link registers, of a first semiconductor package of an information handling system (IHS), that configure an input/output (I/O) communication fabric of the first semiconductor package to route communications of multiple components of the first semiconductor package to multiple inter-processor communication link interfaces; may communicate with a second semiconductor package of the IHS via the multiple inter-processor communication link interfaces; may determine that a link utilization value of multiple link utilization values is at or above a threshold value; and may configure a link register of the multiple link registers, associated with the at least one component of the multiple components, that configures the I/O communication fabric to route communications of the at least one component of the multiple components to a second inter-processor communication link interface of the multiple inter-processor communication link interfaces.

20 Claims, 7 Drawing Sheets

(58) Field of Classification Search
CPC ......... G06F 2213/4812; G06F 2213/24; G06F 2213/0026; G06F 13/4027; G06F 13/4022; G06F 13/26
See application file for complete search history.

(56) References Cited

U.S. PATENT DOCUMENTS

| | | |
|---|---|---|
| 2002/0120800 A1* | 8/2002 | Sugahara ................ G06F 13/24 710/260 |
| 2008/0120441 A1 | 5/2008 | Loewenstein |
| 2013/0054861 A1* | 2/2013 | Tsirkin ................... G06F 13/24 710/266 |
| 2014/0032829 A1 | 1/2014 | Solihin |
| 2014/0223060 A1* | 8/2014 | Tsirkin ................... G06F 13/24 710/261 |
| 2015/0033082 A1 | 1/2015 | Shirlen et al. |
| 2015/0067246 A1 | 3/2015 | Kanchana et al. |
| 2017/0228316 A1 | 8/2017 | Steinmacher-Burow |
| 2018/0285269 A1 | 10/2018 | McAvoy et al. |
| 2019/0013965 A1 | 1/2019 | Sindhu et al. |
| 2019/0196574 A1 | 6/2019 | Tsien et al. |
| 2019/0286610 A1 | 9/2019 | Dalton et al. |

* cited by examiner

SYSTEM AND METHOD OF REROUTING AN INTER-PROCESSOR COMMUNICATION LINK BASED ON A LINK UTILIZATION VALUE

BACKGROUND

Field of the Disclosure

This disclosure relates generally to information handling systems and more particularly to inter-processor information communication.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may configure multiple link registers, of a first semiconductor package of an information handling system, that configure an input/output (I/O) communication fabric of the first semiconductor package to route communications of multiple components of the first semiconductor package to multiple inter-processor communication link interfaces; may communicate with a second semiconductor package of the information handling system via the multiple inter-processor communication link interfaces; may determine multiple link utilization values respectively associated with the multiple inter-processor communication link interfaces; may store the multiple link utilization values via respective multiple link utilization registers; may monitor the multiple link utilization values via the respective multiple link utilization registers; may determine that a link utilization value of the multiple link utilization values is at or above a threshold value; may generate an interrupt request (IRQ); may provide the IRQ to a processor of the first semiconductor package; may receive the IRQ; may determine that communications of at least one component of the multiple components are routed, by the I/O communication fabric, to a first inter-processor communication link interface of the multiple inter-processor communication link interfaces; and may configure a link register of the multiple link registers, associated with the at least one component of the multiple components, that configures the I/O communication fabric to route communications of the at least one component of the multiple components to a second inter-processor communication link interface of the multiple inter-processor communication link interfaces.

In one or more embodiments, generating the IRQ may be performed in response to determining that the link utilization value of the multiple link utilization values is at or above the threshold value. In one or more embodiments, determining that the communications of the at least one component of the multiple components are routed, by the I/O communication fabric, to the first inter-processor communication link interface of the multiple inter-processor communication link interfaces may be performed in response to the processor of the first semiconductor package receiving the IRQ. In one or more embodiments, configuring the link register of the multiple link registers, associated with the at least one component of the multiple components, that configures the I/O communication fabric to route communications of the at least one component of the multiple components to the second inter-processor communication link interface of the multiple inter-processor communication link interfaces may be performed in response to the processor of the first semiconductor package receiving the IRQ.

In one or more embodiments, the processor of the first semiconductor package may determine that the communications of the at least one component of the multiple components are routed, by the I/O communication fabric, to the first inter-processor communication link interface of the multiple inter-processor communication link interfaces. In one or more embodiments, the processor of the first semiconductor package may configure the link register of the multiple link registers, associated with the at least one component of the multiple components, that configures the I/O communication fabric to route communications of the at least one component of the multiple components to the second inter-processor communication link interface of the multiple inter-processor communication link interfaces.

In one or more embodiments, the at least one component of the multiple components may include the processor of the first semiconductor package. In one or more embodiments, the at least one component of the multiple components may include at least one I/O module. For example, the at least one I/O module may include at least one peripheral component interconnect express (PCIe) root complex. In one or more embodiments, monitoring the multiple link utilization values via the respective multiple link utilization registers may include retrieving the multiple link utilization values from the respective multiple link utilization registers. In one or more embodiments, determining that the link utilization value of the multiple link utilization values is at or above the threshold value may include a comparator comparing the link utilization value with the threshold value. In one or more embodiments, the multiple components may include at least one graphics processing unit.

In one or more embodiments, configuring the multiple link registers, of the first semiconductor package, that configure the I/O communication fabric of the first semiconductor package to route communications of the multiple components of the first semiconductor package to the multiple inter-processor communication link interfaces of the first semiconductor package may include configuring a link register of the multiple link registers associated with a first component of the multiple components to utilize a first inter-processor communication link interface of the multiple inter-processor communication link interfaces. In one or more embodiments, configuring the multiple link registers, of the first semiconductor package, that configure the I/O communication fabric of the first semiconductor package to route communications of the multiple components of the first semiconductor package to the multiple inter-processor communication link interfaces of the first semiconductor package may include configuring respective link registers associated with other components, other than the first component, of the multiple components to utilize other inter-processor communication link interfaces, other than the first inter-processor communication link interface, of the multiple inter-processor communication link interfaces.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
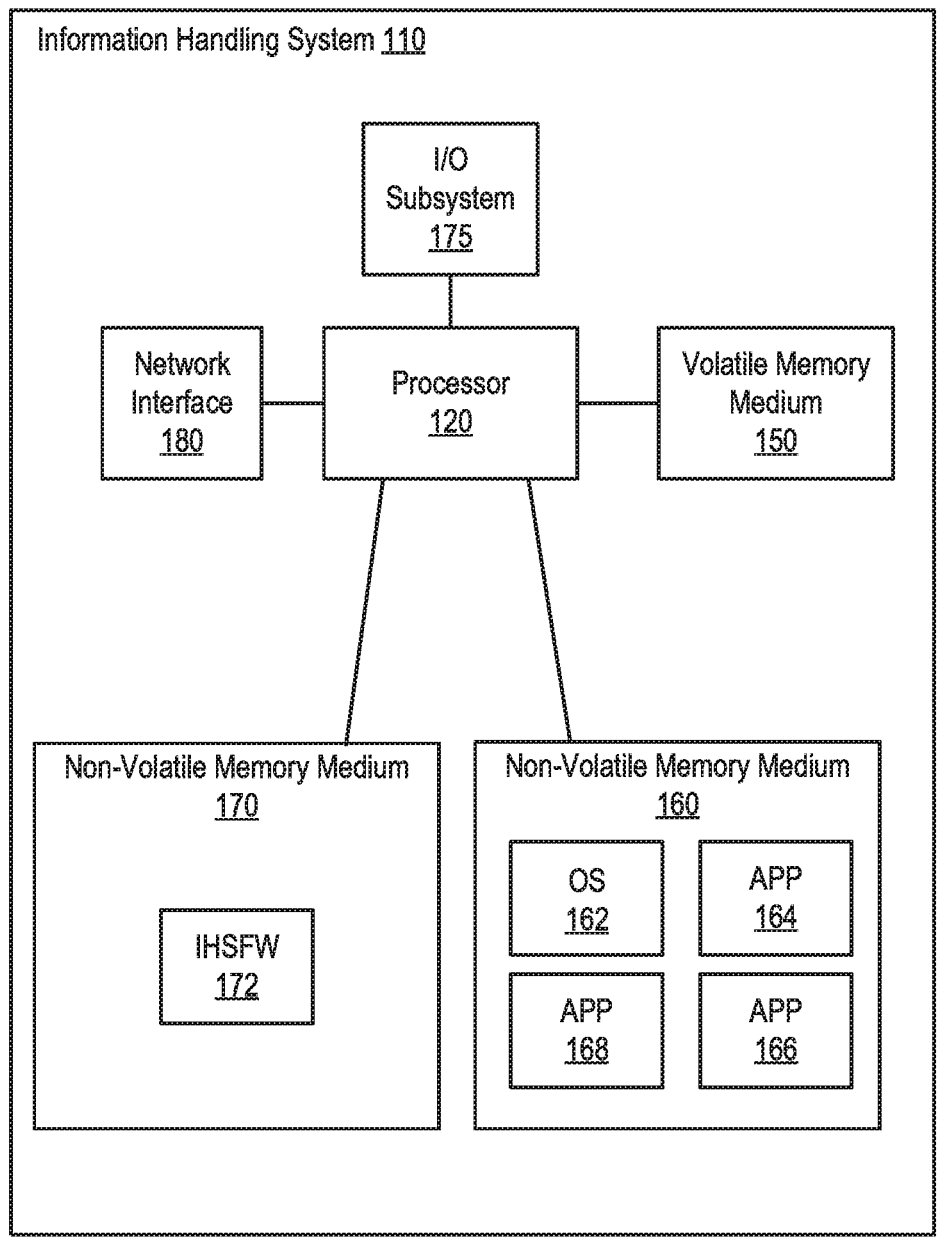
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a planar (e.g., a motherboard) may include multiple ports. For example, a port of a planar may be associated with a Serializer/Deserializer (SerDes) of the planar. For instance, a SerDes may convert data between a serial interface and a parallel interface. In one or more embodiments, a SerDes may be utilized in communicating with a processor. In one example, a device may utilize a SerDes in communicating with a processor. In one instance, the SerDes may include a serial AT attachment (SATA), and a device may utilize SATA in communicating with a processor. In a second instance, the SerDes may include a serial attached SCSI (SAS), and a device may utilize SAS in communicating with a processor. In a third instance, the SerDes may include a universal serial bus (USB), and a device may utilize USB in communicating with a processor. In another instance, the SerDes may include a peripheral component interconnect express (PCIe), and a device may utilize PCIe in communicating with a processor. In another example, a first processor and a second processor may utilize a SerDes in communicating with each other. In one instance, the first processor and the second processor may utilize a low latency cache coherent interlink in communicating with each other. In a second instance, the first processor and the second processor may utilize a QuickPath Interconnect (QPI), available from Intel Corporation, in communicating with each other. In a third instance, the first processor and the second processor may utilize an UltraPath Interconnect (UPI), available from Intel Corporation, in communicating with each other. In a fourth instance, the first processor and the second processor may utilize HyperTransport (HT), available from Advanced Micro Devices, Inc., in communicating with each other. In a fifth instance, the first processor and the second processor may utilize an external global memory interface (xGMI), available from Advanced Micro Devices, Inc., in communicating with each other. In a sixth instance, the first processor and the second processor may utilize a second generation external global memory interface (xGMI2), available from Advanced Micro Devices, Inc., in communicating with each other. In a seventh instance, the first processor and the second processor may utilize an Infinity Fabric, available from Advanced Micro Devices, Inc., in communicating with each other. In an eighth instance, the first processor and the second processor may utilize a cache coherent interconnect for accelerators (CCIX) in communicating with each other. In another instance, the first processor and the second processor may utilize Gen-Z Interconnect, available from the Gen-Z Consortium, in communicating with each other.

In one or more embodiments, a first processor and a second processor may utilize a processor to processor fabric link in communicating with each other. For example, the processor to processor fabric link may include or may be compliant with one or more of QPI, UPI, HT, xGMI, xGMI2, Gen-Z, a CCIX, and an Infinity Fabric, among others. In one or more embodiments, the processor to processor fabric link may be or include processor to processor cache-coherent fabric link.

In one or more embodiments, Gen-Z may provide high-speed, low-latency, memory-semantic access to data and devices via direct-attached, switched or fabric topologies. For example, a Gen-Z fabric may utilize memory-semantic communications in transferring data between memories on different components. For instance, memory-semantic communications may be efficient and/or simple. In one or more embodiments, a Gen-Z component may support up to $2^{64}$ bytes of addressable memory. In one or more embodiments, Gen-Z may support one or more of a co-packaged solution, cache coherency, peripheral component interconnect (PCI) and PCIe technology, atomic operations, and collective operations, among others. For example, Gen-Z may support multiple topologies, such as co-packages, point-to-point, mesh, and/or switch-based, among others. For instance, Gen-Z may support multi-way memory interleaving across a set of point-to-point and/or switch attached memory components, among others.

In one or more embodiments, one or more processors of an information handling system may utilize non-uniform memory access (NUMA). For example, one or more processors of an information handling system may communicate with a device and/or another processor via NUMA. For instance, SerDes may be utilized in communicating via NUMA. In one or more embodiments, a first processor may request data from storage associated with a second processor. In one example, the first processor may request data from a main memory of the second processor. In another example, the first processor may request data from a device that is associated with direct memory access (DMA) associated with main memory of the second processor.

In one or more embodiments, utilizing a NUMA architecture may provide multiple configurations associated with communicatively coupling a processor to a device and/or communicatively coupling a first processor with a second processor. For example, a PHY may be utilized in configurations associated with communicatively coupling a processor to a device and/or communicatively coupling a first processor with a second processor. For instance, the PHY may be or include a PCIe PHY.

In one or more embodiments, performance of a multiple processor system may be based at least on one or more access times associated with communicating data between two processors via inter-processor communication links. For example, a first semiconductor package and a second semiconductor package may include a first processor core and a second processor core, respectively. For instance, the performance of the multiple processor system may be based at least on one or more access times associated with communicating data between the first processor core and the second processor core via one or more inter-processor communication links. In one or more embodiments, scheduling optimizations may be utilized by an operating system in an attempt to balance utilization of multiple processor cores.

In one or more embodiments, in one or more information handling system architectures, saturation of one or more inter-processor links may be possible. For example, saturation of one or more inter-processor communication links may be possible via multiple processor cores, memory channels, input/output channels, and/or PCIe channels, among others. In one instance, saturation of a first inter-processor communication link may increase data utilization of a second inter-processor communication link with data from the first inter-processor communication link. In another instance, saturation of a first inter-processor communication link may increase a probability of a second inter-processor communication link becoming saturated with data from the first inter-processor communication link.

In one or more embodiments, an asymmetry may exist between a number of processor cores of a semiconductor package and a number of inter-processor communication links. For example, a number of processor cores of a semiconductor package may be eight, and a number of inter-processor communication links may be three. For instance, eight processors of a first semiconductor package and eight processors of a second semiconductor package, different from the first semiconductor package, may utilize three inter-processor communication links. In one or more embodiments, the three inter-processor communication links may communicatively couple the first semiconductor package and the second semiconductor package. In one or more embodiments, an asymmetry between a number of processor cores of a semiconductor package and a number of inter-processor communication links may generate or induce an unequal traffic utilization of the inter-processor communication links. For example, the asymmetry between the number of processor cores of the semiconductor package and the number of inter-processor communication links may generate or induce an unequal sharing of the inter-processor communication links. In one or more embodiments, an operating system may not be able to monitor traffic utilization of the inter-processor communication links. For example, a scheduler of the operating system may not have a visibility into bandwidth utilization of the inter-processor communication links.

In one or more embodiments, processor cores of a semiconductor package may be communicatively coupled to a communication fabric of the semiconductor package. For example, inter-processor communication links may be communicatively coupled to the communication fabric of the semiconductor package. For instance, a processor core of the semiconductor package may utilize the communication fabric of the semiconductor package to communicate via one or more inter-processor communication links.

In one or more embodiments, a mapping may map processor cores of a semiconductor package to inter-processor communication links. For example, if an asymmetry exists between a number of processor cores of the semiconductor package and a number of inter-processor communication links, the mapping may be or include an asymmetric mapping of the processor cores of the semiconductor package to the inter-processor communication links. In one or more embodiments, the asymmetric mapping of the processor cores of the semiconductor package to the inter-processor communication links may generate or induce an unequal traffic utilization of the inter-processor communication links. For example, the asymmetric mapping of the processor cores of the semiconductor package to the inter-processor communication links may generate or induce an unequal sharing of the inter-processor communication links.

In one or more embodiments, a link utilization register may be associated with an inter-processor communication link. For example, the link utilization register may store link utilization information. In one instance, the link utilization information may include an amount of incoming data per a time period. In a second instance, the link utilization information may include an amount of outgoing data per a time period. In a third instance, the link utilization information may include a ratio of an amount incoming data to a threshold per a time period. In another instance, the link utilization information may include a ratio of an amount outgoing data to a threshold per a time period. In one or more embodiments, a link utilization monitor may monitor utilization of an inter-processor communication link. In one example, the link utilization monitor may determine an amount of incoming data per a time period. In a second instance, the link utilization monitor may determine an amount of outgoing data per a time period. In a third instance, the link utilization monitor may determine a ratio of an amount incoming data to a threshold per a time period. In another instance, the link utilization monitor may determine a ratio of an amount outgoing data to a threshold per a time period.

In one or more embodiments, a semiconductor package may include a link register. For example, the link register may store information associated with an inter-processor communication link that the semiconductor package utilizes. In one or more embodiments, the link register may be configured to store information associated with an inter-processor communication link that the semiconductor package utilizes. In one example, the link register may be configured to store first information associated with a first inter-processor communication link that the semiconductor package utilizes. In another example, the link register may be configured to store second information, different from the first information, associated with a second inter-processor communication link, different from the first inter-processor communication link, that the semiconductor package utilizes. In one or more embodiments, semiconductor package may be or include an input/output (I/O) module. For example, an I/O module may be or include an I/O complex. For instance, an I/O module may be or include a PCIe root complex. In one or more embodiments, an I/O module may include a link register.

In one or more embodiments, the link register may be configured to store first information associated with a first inter-processor communication link that the semiconductor package utilizes, and the link register may be subsequently configured to store second information, different from the first information, associated with a second inter-processor communication link, different from the first inter-processor communication link, that the semiconductor package will utilize. For example, the semiconductor package may be utilized the second inter-processor communication link after the link register is configured with the second information. In one or more embodiments, a mapping that map processor cores of semiconductor packages to inter-processor communication links may be dynamically changed by configuring and/or reconfiguring one or more link registers of respective one or more components of a semiconductor package.

In one or more embodiments, link utilization information of a link utilization register may be compared with a link utilization threshold. For example, the comparison may indicate that the link utilization information of the link utilization register may be at or above the link utilization threshold. In one or more embodiments, if the link utilization information of the link utilization register is at or above the link utilization threshold, an interrupt request (IRQ) may be generated. For example, the IRQ may be provided to a component of an information handling system. For instance, the IRQ may be provided to a processor of the information handling system. In one or more embodiments, an IRQ may be or include a hardware signal sent to the processor. For example, the processor may receive the IRQ. In one instance, the processor may stop executing first instructions in response to receiving the IRQ. In another instance, the processor may start executing second instructions in response to receiving the IRQ. In one or more embodiments, the second instructions may be or include an interrupt handler. For example, the interrupt handler may be configured to respond to an event and/or a state where the link utilization information of the link utilization register is at or above the link utilization threshold.

In one or more embodiments, a link utilization monitor may compare information of a link utilization register with a link utilization threshold. For example, the link utilization monitor may determine if the information of the link utilization register is at or above the link utilization threshold. For instance, the link utilization monitor may include a comparator that may determine if the information of the link utilization register is at or above the link utilization threshold. In one or more embodiments, the link utilization monitor may generate an IRQ if the information of the link utilization register is at or above the link utilization threshold.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various I/O devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a PCI bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a USB, a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), SAS or another transport that operates with the SCSI protocol, advanced technology attachment (ATA), SATA, a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 2A:
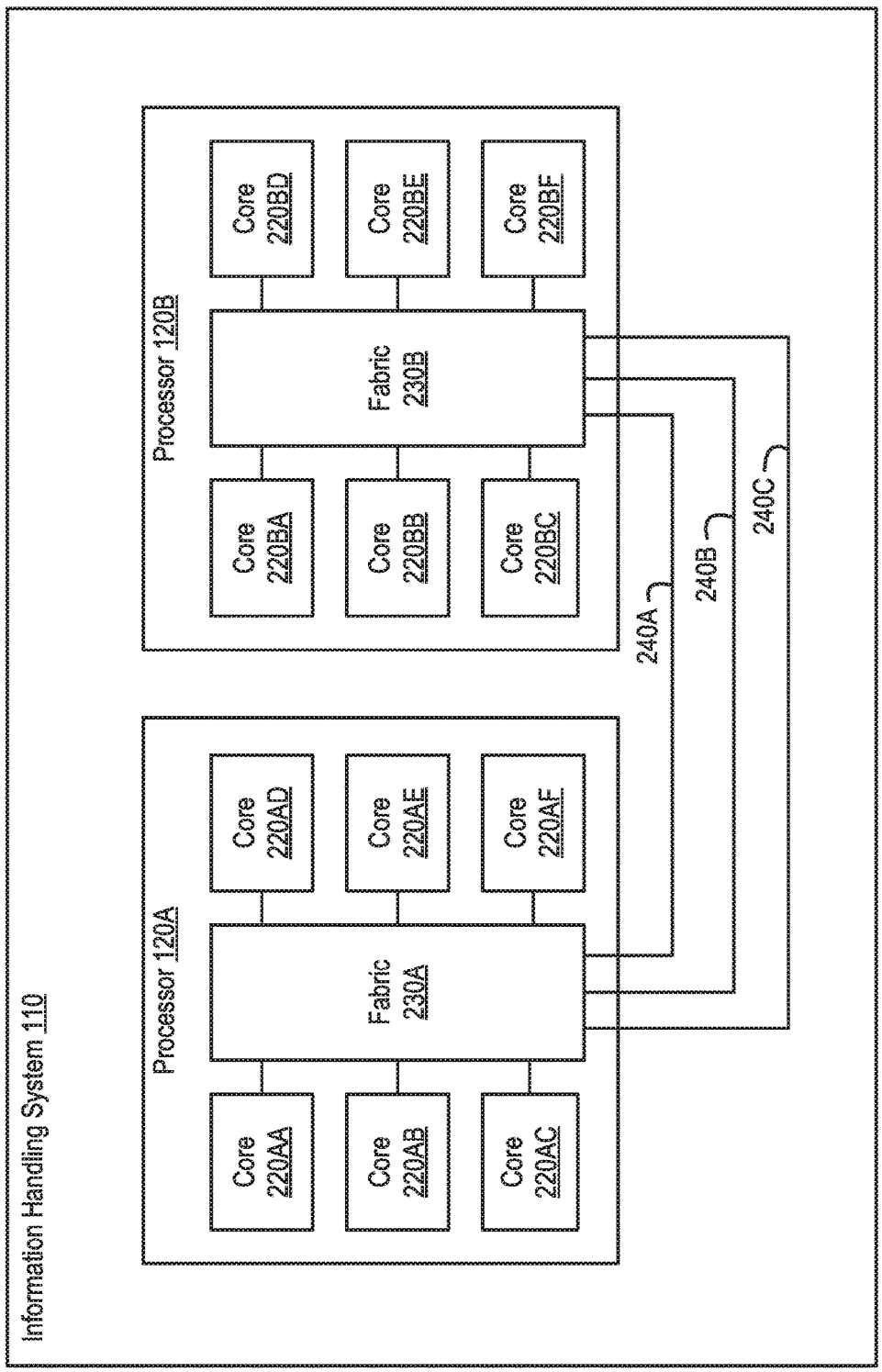
FIG. 2A illustrates a second example of an information handling system, according to one or more embodiments.

Turning now to FIG. 2A, a second example of an information handling system is illustrated, according to one or more embodiments. As shown, IHS 110 may include processors 120A and 120B. As illustrated, processor 120A may include cores 220AA-220AF (e.g., processor cores). As shown, processor 120A may include a fabric 230A. In one or more embodiments, a fabric 230 may be or include a communication fabric. As illustrated, cores 220AA-220AF may be communicatively coupled to fabric 230A. As shown, processor 120B may include cores 220BA-220BF (e.g., processor cores). As illustrated, processor 120B may include a fabric 230B. As shown, cores 220BA-220BF may be communicatively coupled to fabric 230B. In one or more embodiments, a processor 120 may be or include a semiconductor package. For example, the semiconductor package may be coupled to a socket of IHS 110.

As illustrated, fabric 230A may be communicatively coupled to fabric 230B via couplings 240A-240C. In one or more embodiments, a coupling 240 may be or include a cable assembly. For example, a coupling 240 may be or include a SlimLine twin axial cable assembly, available from 3M Company. In one or more embodiments, a coupling 240 may be associated with a type of coupling. In one example, a type of coupling may be or include an USB coupling. In a second example, a type of coupling may be or include a SAS coupling. In a third example, a type of coupling may be or include a SATA coupling. In a fourth example, a type of coupling may be or include a PCIe coupling. In a fifth example, a type of coupling may be or include a xGMI coupling. For instance, coupling 240 may be or include a xGMI cable. In a sixth example, a type of coupling may be or include a xGMI2 coupling. For instance, coupling 240 may be or include a xGMI2 cable. In another example, a type of coupling may be or include a processor to processor fabric link. For instance, coupling 240 may be or include a processor to processor fabric link cable.

In one or more embodiments, a coupling 240 may be associated with one or more properties. For example, the one or more properties may be associated with one or more applications. For instance, the one or more applications may include one or more of a PCIe application, a SATA application, a USB application, a xGMI application, a xGMI2 application, and a processor to processor fabric link application, among others. In one or more embodiments, a coupling 240 may be or include printed circuit board (PCB) traces. For example, a coupling 240 may be or include PCB traces of a planar.

Figure 2B:
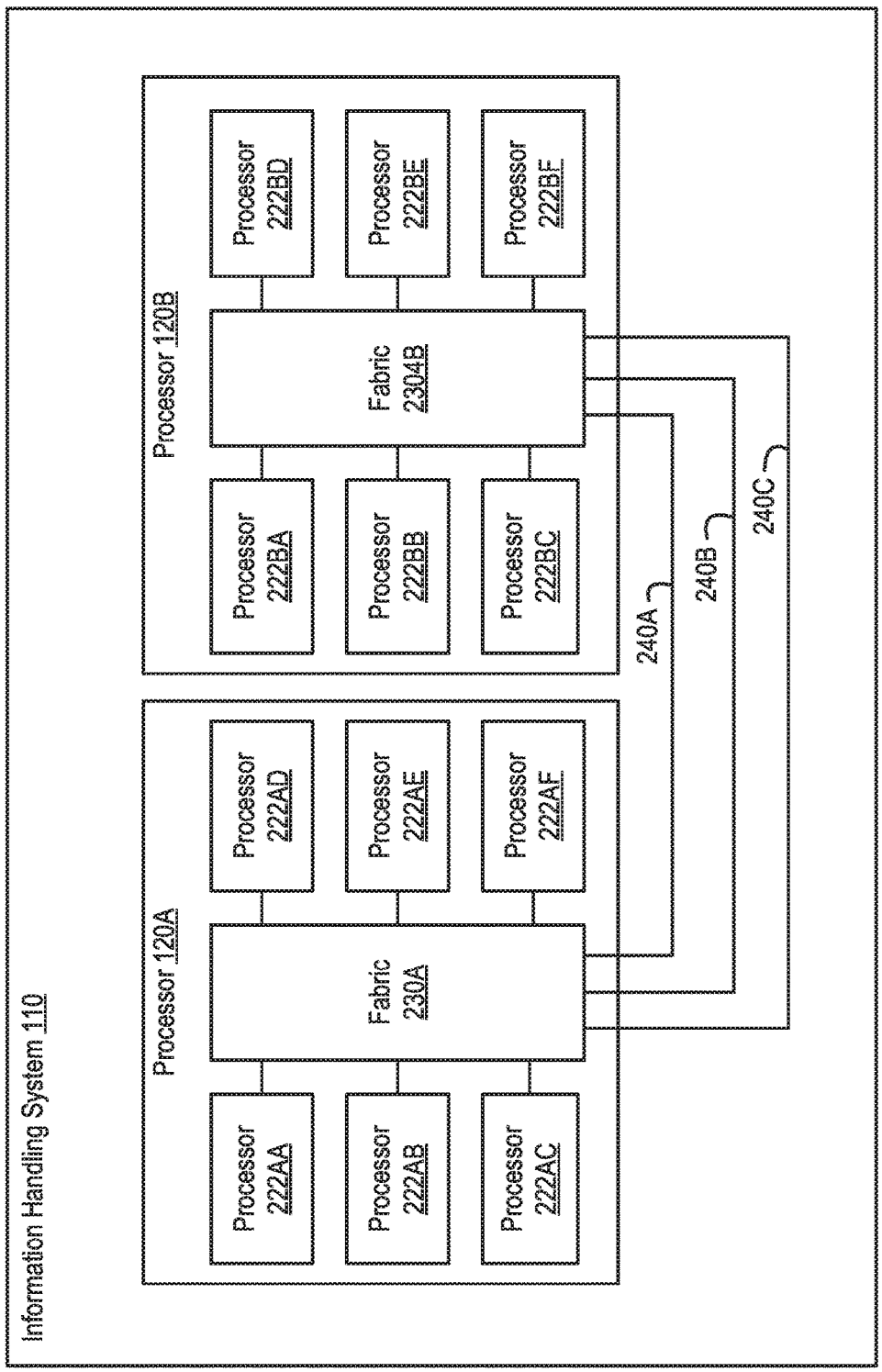
FIG. 2B illustrates a third example of an information handling system, according to one or more embodiments.

Turning now to FIG. 2B, a third example of an information handling system is illustrated, according to one or more embodiments. As shown, IHS 110 may include processors 120A and 120B. As illustrated, processor 120A may include processors 222AA-222AF. As shown, processor 120A may include fabric 230A. In one or more embodiments, a fabric 230 may be or include a communication fabric. As illustrated, processors 222AA-222AF may be communicatively coupled to fabric 230A. As shown, processor 120B may include processors 222BA-222BF. As illustrated, processor 120B may include fabric 230B. As shown, processors 222BA-222BF may be communicatively coupled to fabric 230B. As illustrated, fabric 230A may be communicatively coupled to fabric 230B via couplings 240A-240C. In one or more embodiments, a processor 222 may include multiple processor cores.

Figure 3A:
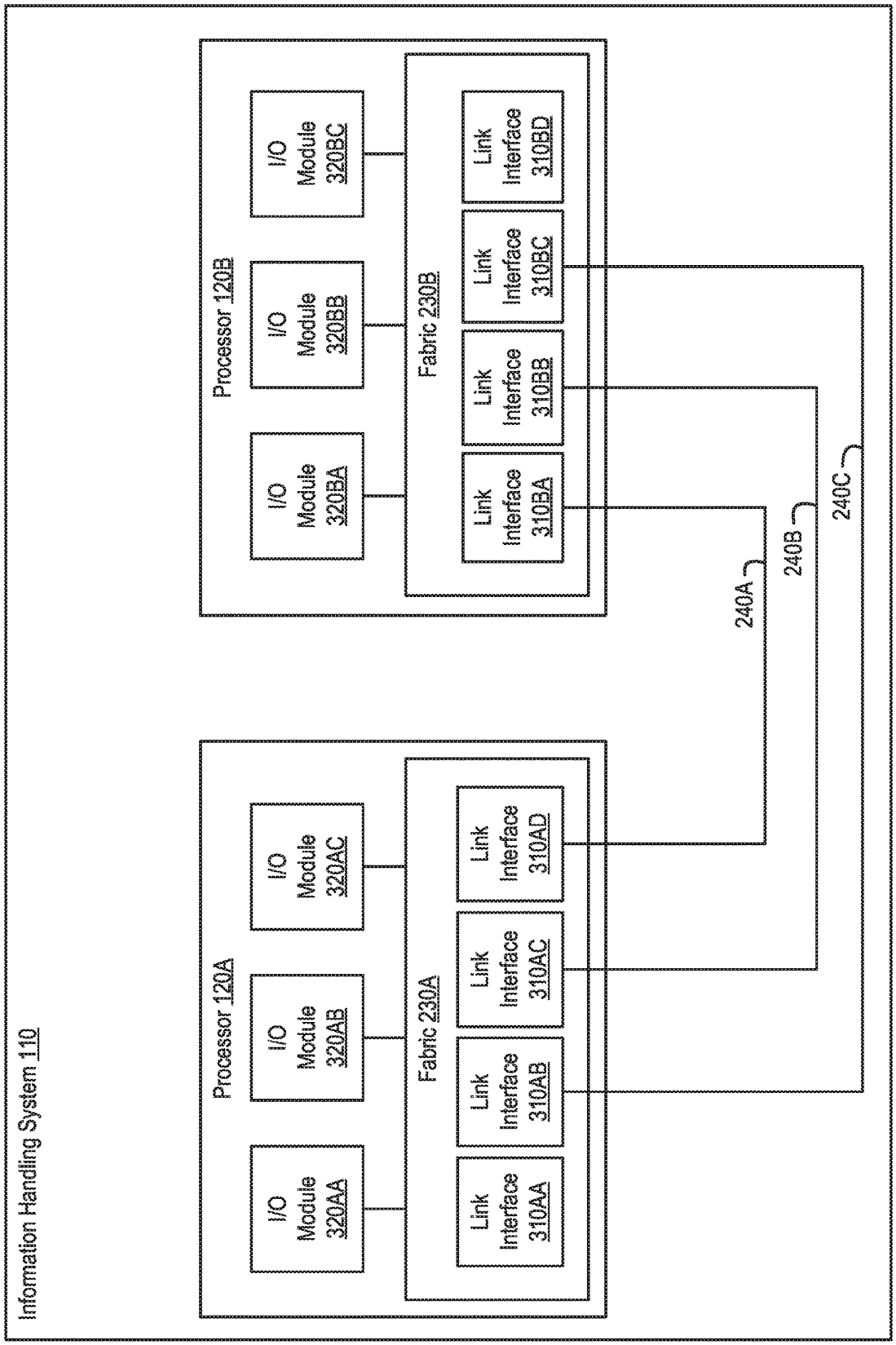
FIG. 3A illustrates another example of an information handling system, according to one or more embodiments.

Turning now to FIG. 3A, another example of an information handling system is illustrated, according to one or more embodiments. As shown, fabric 230A may include link interface 310AA-310AD. In one or more embodiments, a link interface 310 may be or include a processor to processor fabric link interface. As illustrated, link interfaces 310AB, 310AC, and 310AD may be coupled to couplings 240C, 240B, and 240A, respectively. As shown, processor 120A may include I/O modules 320AA-320AC. In one or more embodiments, an I/O modules 320 may be or include a PCIe root complex. As illustrated, I/O modules 320AA-320AC may be communicatively coupled to fabric 230A. As shown, fabric 230B may include link interface 310BA-310BD. As illustrated, link interfaces 310BA, 310BB, and 310BC may be coupled to couplings 240A, 240B, and 240C, respectively. As shown, processor 120B may include I/O modules 320BA-320BC. As illustrated, I/O modules 320BA-320BC may be communicatively coupled to fabric 230B.

Figure 3B:
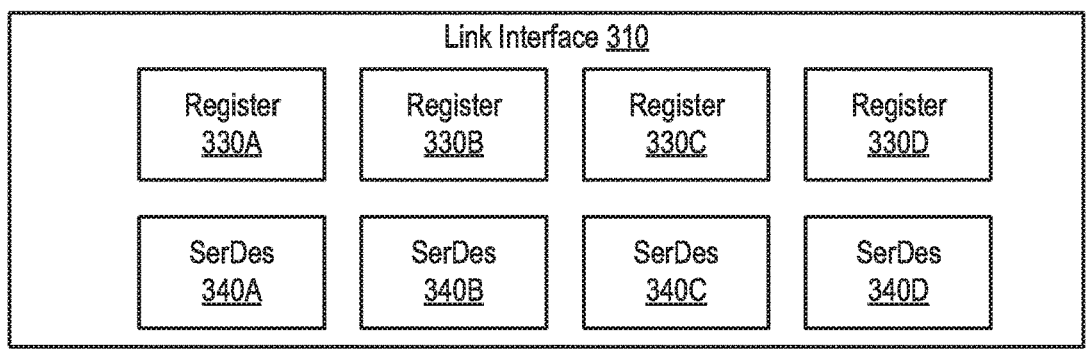
FIG. 3B illustrates an example of a link interface, according to one or more embodiments.

Turning now to FIG. 3B, an example of a link interface is illustrated, according to one or more embodiments. As shown, a link interface 310 may include registers 330A-330D. In one or more embodiments, link interface 310 may include any number of registers 330. As illustrated, link interface 310 may include serializers/deserializers 340A-340D. In one or more embodiments, link interface 310 may include any number of serializers/deserializers 340.

Figure 3C:
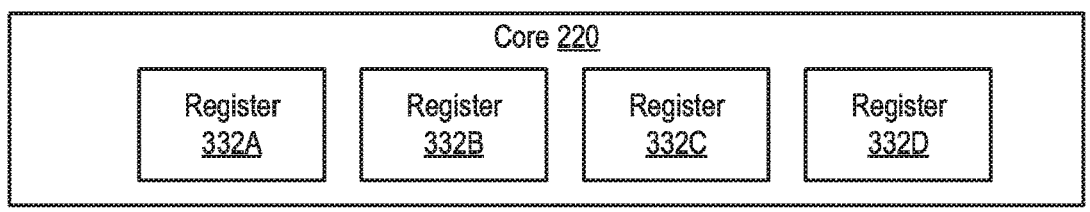
FIG. 3C illustrates an example of a core, according to one or more embodiments.

Turning now to FIG. 3C, an example of a core is illustrated, according to one or more embodiments. As shown, core 220 may include registers 332A-332D. In one or more embodiments, core 220 may include any number of registers 332. In one or more embodiments, core 220 may be or include a processor core. For example, core 220 may implement an instruction set architecture. For instance, core 220 may execute processor instructions that may implement at least a portion of one or more systems, one or more flowcharts, one or more methods, and/or one or more processes described herein. In one or more embodiments, a core 220 may be or include a graphics processing unit (GPU) core.

Figure 3D:
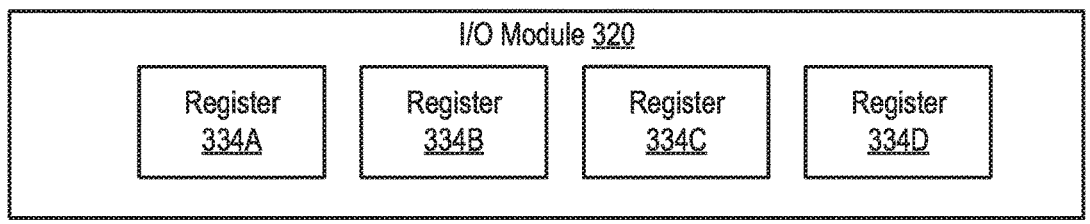
FIG. 3D illustrates an example of an I/O module, according to one or more embodiments.

Turning now to FIG. 3D, an example of an I/O module is illustrated, according to one or more embodiments. As shown, an I/O module 320 may include registers 334A-334D. In one or more embodiments, I/O module 320 may include any number of registers 334.

Figure 3E:
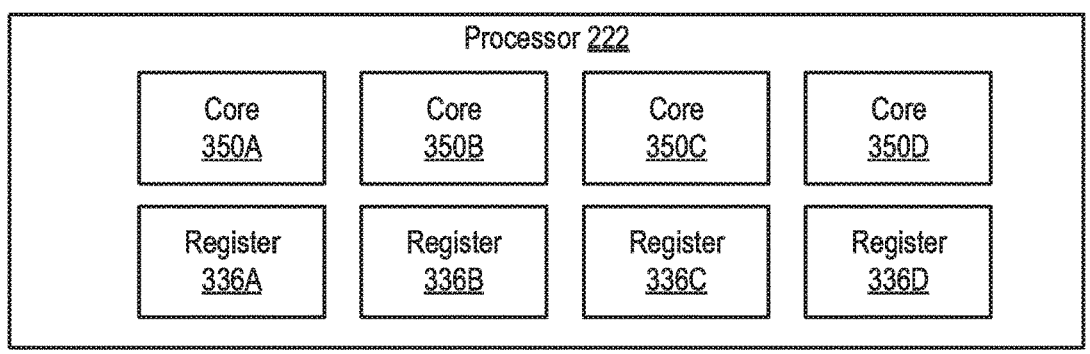
FIG. 3E illustrates an example of a processor, according to one or more embodiments.

Turning now to FIG. 3E, an example of a processor is illustrated, according to one or more embodiments. As shown, a processor 222 may include cores 350A-350D. In one or more embodiments, processor 222 may include any number of cores 350. In one or more embodiments, a core 350 may include one or more structures and/or one or more functionalities as those described with reference to a core 220. As illustrated, processor 222 may include registers 336A-336D. In one or more embodiments, processor 222 may include any number of registers 336. In one or more embodiments, processor 222 may be or include a GPU. For example, a core 350 may be or include a GPU core.

Figure 4:
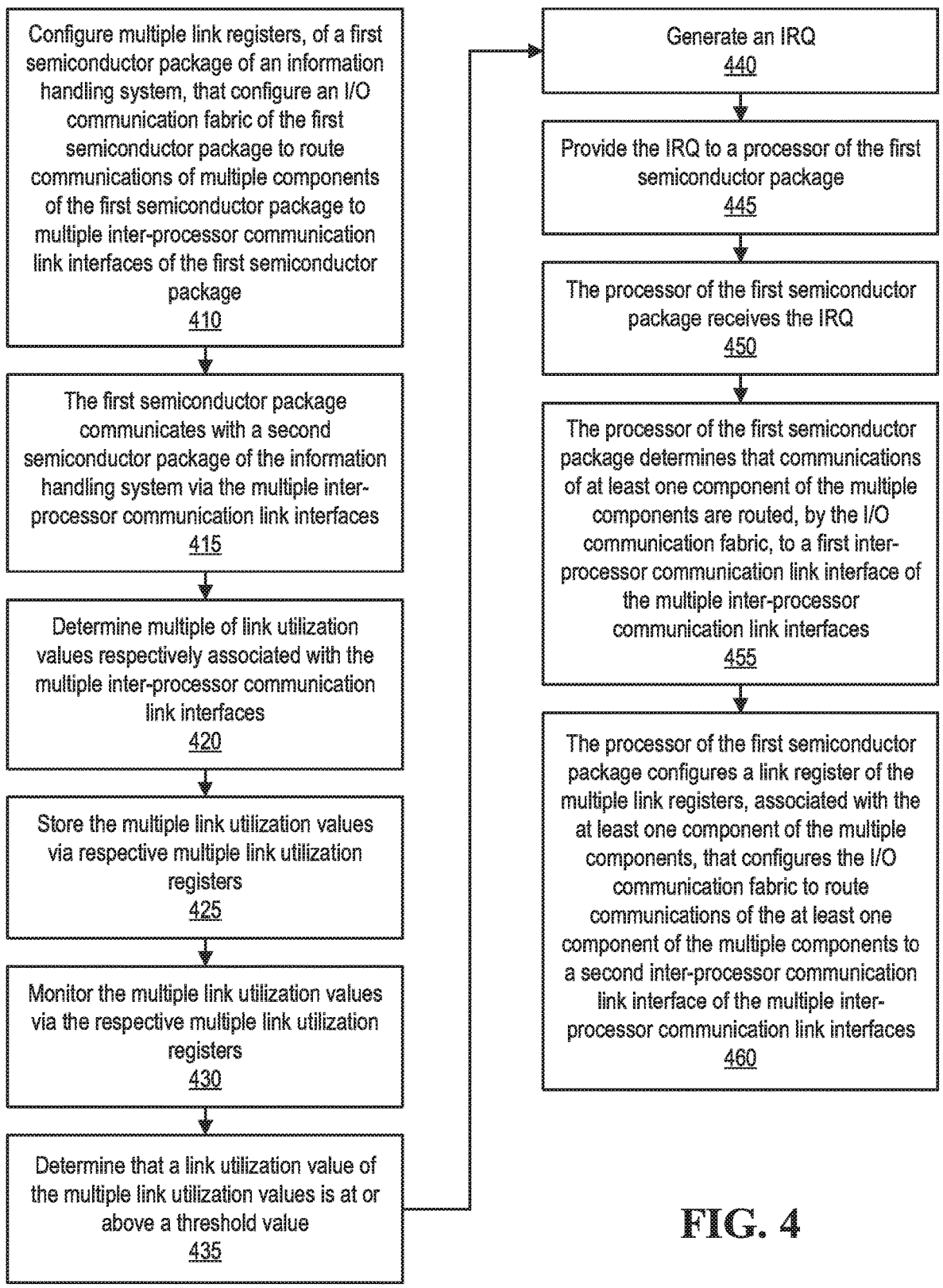
FIG. 4 illustrates an example of a method of operating an information handling system, according to one or more embodiments.

Turning now to FIG. 4, an example of a method of operating an information handling system is illustrated, according to one or more embodiments. At 410, multiple link registers, of a first semiconductor package of an information handling system, that configure an I/O communication fabric of the first semiconductor package may be configured to route communications of a multiple components of the first semiconductor package to multiple inter-processor communication link interfaces of the first semiconductor package. For example, the first semiconductor package may be or include processor 120A. For instance, the multiple inter-processor communication link interfaces of the first semiconductor package may include multiple of link interfaces 310AA-310AD.

In one or more embodiments, each of the multiple components of the first semiconductor package may be associated with a link register of the multiple link registers. In one or more embodiments, a link register associated with a component of the first semiconductor package may configure the I/O communication fabric to route communications of the component to an inter-processor communication link interface of the multiple inter-processor communication link interfaces. In one example, a component of the multiple components may be or include a core 220. For instance, a register 332 may be or include a link register of the multiple link registers and may configure fabric 230 to route communications of core 230 to a link interface of link interfaces 310. In a second example, a component of the multiple components may be or include a processor 222. For instance, a register 336 may be or include a link register of the multiple link registers and may configure fabric 230 to route communications of processor 222 to a link interface of link interfaces 310. In a third example, a component of the multiple components may be or include a core 350. For instance, a register associated with core 350 may be or include a link register of the multiple link registers and may configure fabric 230 to route communications of core 350 to a link interface of link interfaces 310. In another example, a component of the multiple components may be or include an I/O module. For instance, a register 334 may be or include a link register of the multiple link registers and may configure fabric 230 to route communications of I/O module to a link interface of link interfaces 310.

In one or more embodiments, configuring the multiple link registers, of the first semiconductor package, that configure the I/O communication fabric of the first semiconductor package to route communications of the multiple components of the first semiconductor package to the multiple inter-processor communication link interfaces of the first semiconductor package may include configuring a link register of the multiple link registers associated with a first component of the multiple components to utilize a first inter-processor communication link interface of the multiple inter-processor communication link interfaces. In one or more embodiments, configuring the multiple link registers, of the first semiconductor package, that configure the I/O communication fabric of the first semiconductor package to route communications of the multiple components of the first semiconductor package to the multiple inter-processor communication link interfaces of the first semiconductor package may include configuring respective link registers associated with other components, other than the first component, of the multiple components to utilize other inter-processor communication link interfaces, other than the first inter-processor communication link interface, of the multiple inter-processor communication link interfaces.

At 415, the first semiconductor package may communicate with a second semiconductor package of the information handling system via the multiple inter-processor communication link interfaces. For example, the second semiconductor package may be or include processor 120B. For instance, processor 120A may communicate with processor 120B via multiple inter-processor communication link interfaces 310. In one or more embodiments, multiple inter-processor communication link interfaces 310 may be coupled to respective multiple couplings 240.

At 420, multiple link utilization values respectively associated with the multiple inter-processor communication link interfaces may be determined. For example, fabric 230A may determine multiple link utilization values respectively associated with the multiple inter-processor communication link interfaces 310. In one instance, a link utilization value may include an amount of incoming data per a time period. In a second instance, the link utilization value may include an amount of outgoing data per a time period. In a third instance, the link utilization value may include a ratio of an amount incoming data to a threshold per a time period. In another instance, the link utilization value may include a ratio of an amount outgoing data to a threshold per a time period.

At 425, the multiple link utilization values may be stored via respective multiple link utilization registers. For example, fabric 230A may store the multiple link utilization values via respective multiple link utilization registers. In one instance, fabric 230A may store a first link utilization value, associated with inter-processor communication link interface 310AB, via a register 330A of inter-processor communication link interface 310AB. In a second instance, fabric 230A may store a second link utilization value, associated with inter-processor communication link interface 310AC, via a register 330A of inter-processor communication link interface 310AC. In another instance, fabric 230A may store a third link utilization value, associated with inter-processor communication link interface 310AD, via a register 330A of inter-processor communication link interface 310AD.

At 430, the multiple link utilization values may be monitored via the respective multiple link utilization registers. For example, fabric 230A may monitor the multiple link utilization values via the respective multiple link utilization registers. In one or more embodiments, monitoring the multiple link utilization values via the respective multiple link utilization registers may include retrieving the multiple link utilization values from the respective multiple link utilization registers.

At 435, it may be determined that a link utilization value of the multiple link utilization values is at or above a threshold value. For example, fabric 230A may determine that a link utilization value of the multiple link utilization values is at or above a threshold value. In one or more embodiments, determining that a link utilization value of the multiple link utilization values is at or above a threshold value may include comparing the link utilization value of the multiple link utilization values with the threshold value. For example, a comparator may compare the link utilization value of the multiple link utilization values with the threshold value. For instance, fabric 230A may include the comparator.

In one or more embodiments, a threshold value may be stored via a register of a link interface. In one example, a first threshold value, associated with inter-processor communication link interface 310AB, may be stored via a register 330B of inter-processor communication link interface 310AB. In a second example, a second threshold value, associated with inter-processor communication link interface 310AC, may be stored via a register 330B of inter-processor communication link interface 310AC. In another example, a third threshold value, associated with inter-processor communication link interface 310AD, may be stored via a register 330B of inter-processor communication link interface 310AD. In one or more embodiments, determining that a link utilization value of the multiple link utilization values is at or above a threshold value may include comparing register 330A of inter-processor communication link interface 310 with register 330B of inter-processor communication link interface 310. For example, the comparator may compare register 330A of inter-processor communication link interface 310 with register 330B of inter-processor communication link interface 310 to determine that a link utilization value of the multiple link utilization values is at or above a threshold value.

At 440, an IRQ may be generated. For example, fabric 230A may generate the IRQ. In one or more embodiments, the IRQ may be generated in response to determining that the link utilization value of the multiple link utilization values is at or above the threshold value. At 445, the IRQ may be provided to a processor of the first semiconductor package. For example, fabric 230A may provide the IRQ to the processor of the first semiconductor package. In one instance, the processor of the first semiconductor package may be or include core 220. In a second instance, the processor of the first semiconductor package may be or include processor 222. In another instance, the processor of the first semiconductor package may be or include core 350. At 450, the processor of the first semiconductor package may receive the IRQ. In one or more embodiments, the IRQ may be or include a hardware signal. For example, the processor of the first semiconductor package may receive the hardware signal.

At 455, the processor of the first semiconductor package may determine that communications of at least one component of the multiple components are routed, by the I/O communication fabric, to a first inter-processor communication link interface of the multiple inter-processor communication link interfaces. For example, the processor of the first semiconductor package may determine that the communications of the at least one component of the multiple components are routed to inter-processor communication link interface 310AD. For instance, the processor of the first semiconductor package may determine that the communications of the at least one component of the multiple components are routed to inter-processor communication link interface 310AD via at least one respective link register associated with the at least one component of the multiple components. In one or more embodiments, the processor of the first semiconductor package may determine that the communications of the at least one component of the multiple components are routed, by the I/O communication fabric, to the first inter-processor communication link interface of the multiple inter-processor communication link interfaces in response to the processor of the first semiconductor package receiving the IRQ.

At 460, a link register of the multiple link registers, associated with the at least one component of the multiple components, that configures the I/O communication fabric may be configured to route communications of the at least one component of the multiple components to a second inter-processor communication link interface of the multiple inter-processor communication link interfaces. For example, a link register of the multiple link registers, associated with the at least one component of the plurality of components, that configures the I/O communication fabric may be configured to route communications of the at least one component of the multiple components to inter-processor communication link 310AC. For instance, the processor of the first semiconductor package may configure the link register to route the communications of the at least one component of the multiple components to inter-processor communication link 310AC.

In one or more embodiments, an OS executing on the processor of the first semiconductor package may configure the link register to route the communications of the at least one component of the multiple components to inter-processor communication link 310AC. For example, the OS executing on the processor of the first semiconductor package may configure, via IHSFW 172, the link register to route the communications of the at least one component of the multiple components to inter-processor communication link 310AC. For instance, the OS executing on the processor of the first semiconductor package may configure, via one or more of WMI and CIM, among others, the link register to route the communications of the at least one component of the multiple components to inter-processor communication link 310AC. In one or more embodiments, the link register of the multiple link registers, associated with the at least one component of the multiple components, that configures the I/O communication fabric may be configured to route communications of the at least one component of the multiple components to the second inter-processor communication link interface of the multiple inter-processor communication link interfaces in response to the processor of the first semiconductor package receiving the IRQ.

Figure 5:
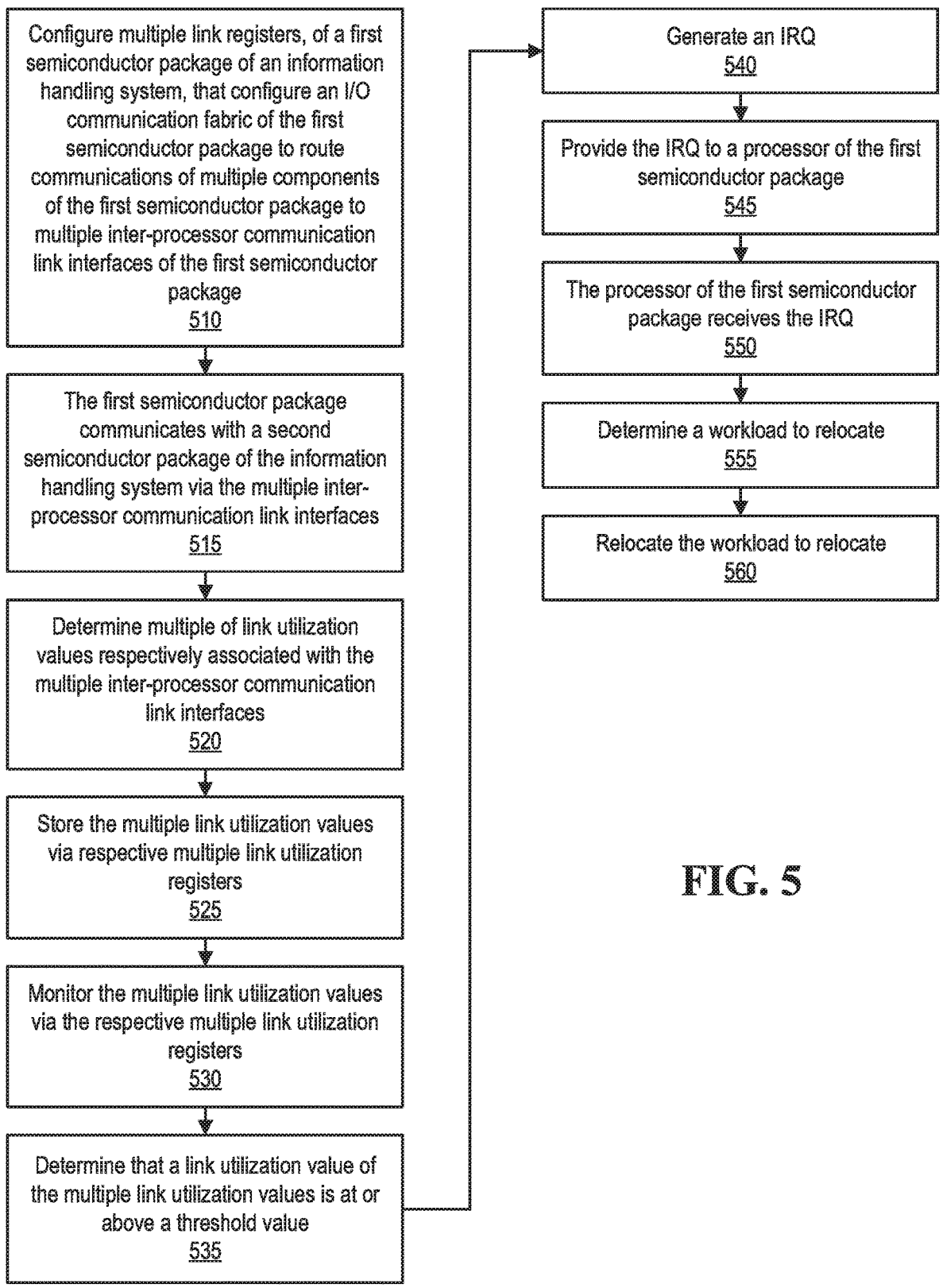
FIG. 5 illustrates an example of another method of operating an information handling system, according to one or more embodiments.

Turning now to FIG. 5, an example of another method of operating an information handling system is illustrated, according to one or more embodiments. In one or more embodiments, method elements 510-550 may be performed in accordance with method elements 410-450, described with reference to FIG. 4.

At 555, a workload to be relocated may be determined. For example, the processor of the first semiconductor package may determine a workload to be relocated. In one instance, the workload may be utilizing more bandwidth that is currently available through the inter-processor communication link being utilized by the workload. In another instance, the workload may be associated with a bandwidth priority that is not being met via the inter-processor communication link being utilized by the workload.

In one or more embodiments, the workload may include one or more of a task, a thread, a process, a program, software, an application, server software, a service, an operating system, a container, and a virtual machine, among others. In one or more embodiments, a container may be or include software in a file system that includes one or more of instructions executable by a processor (e.g., a program, software, an application, server software, a service, etc.), one or more runtime libraries, one or more system tools, and one or more system libraries, among others. For example, a container may be or include a Docker container, a Linux container (LXC), or a Kubernetes pod, among others.

At 560, the workload may be relocated. For example, the workload may be relocated from a first component, of the multiple components of the first semiconductor package, that utilizes a first inter-processor communication link to a second component, of the multiple components of the first semiconductor package, that utilizes a second inter-processor communication link. For instance, the workload may be relocated from the first component that utilizes inter-processor communication link 310AD to the second component that utilizes inter-processor communication link 310AB.

In one or more embodiments, one or more link registers associated with system resources may be configured to overload one or more links. For example, one or more of registers 332A-332D, 334A-334D, and 336A-336D may be configured to overload one or more of links 240A-240C. In one or more embodiments, one or more link registers associated with system resources may be configured to not overload one or more links. For example, the one or more link registers associated with system resources, configured to not overload the one or more links, may be configured such that the one or more links include an amount of overhead bandwidth and/or spare bandwidth available to one or more resources coupled to the one or more links. For instance, one or more of registers 332A-332D, 334A-334D, and 336A-336D may be configured to provide an amount of overhead bandwidth and/or spare bandwidth available to one or more resources coupled to one or more links 240A-240C.

In one example, a link register 336 of processor 222AA may be configured such that processor 222AA utilizes link 240A. For instance, each of respective link registers 336 of other processors 222AB-222AF may be configured link 240B or 240C. In this example, high priority tasks may be assigned and/or allocated to processor 222AA. Furthermore, lower priority tasks may be assigned and/or allocated to other processors 222AB-222AF. In this fashion, one or more high priority tasks may have at least one inter-processor link dedicated to inter-processor communication. For instance, the at least one inter-processor link dedicated to inter-processor communication may ensure that the one or more high priority tasks may have dedicated link bandwidth for inter-processor communication.

In a second example, a link register 332 of core 220AA may be configured such that processor core 220AA utilizes link 240A. For instance, each of respective link registers 332 of other cores 220AB-220AF may be configured link 240B or 240C. In this example, high priority tasks may be assigned and/or allocated to core 220AA. Furthermore, lower priority tasks may be assigned and/or allocated to other cores 220AB-220AF. In this fashion, one or more high priority tasks may have at least one inter-processor link dedicated to inter-processor communication. For instance, the at least one inter-processor link dedicated to inter-processor communication may ensure that the one or more high priority tasks may have dedicated link bandwidth for inter-processor communication.

In another example, a link register 334 of I/O module 320AA may be configured such that I/O module 320AA 220AA utilizes link 240A. In one instance, each of respective link registers 334 of other I/O modules 320AB and 320AC may be configured link 240B or 240C. In a second instance, each of respective link registers 336 of processors 222AA-222AF may be configured link 240B or 240C. In another instance, each of respective link registers 332 of cores 220AA-220AF may be configured link 240B or 240C. In this example, high priority tasks may be assigned and/or allocated to I/O module 320AA. Furthermore, lower priority tasks may be assigned and/or allocated to cores 220AA-220AF and/or to processors 222AA-222AF. In this fashion, one or more high priority tasks may have at least one inter-processor link dedicated to inter-processor communication. For instance, the at least one inter-processor link dedicated to inter-processor communication may ensure that the one or more high priority tasks may have dedicated link bandwidth for inter-processor communication.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a plurality of semiconductor packages, each of the plurality of packages includes a plurality of processor cores and an input/output (I/O) communication fabric; and
a memory medium, coupled to a processor core of a first semiconductor package of the plurality of semiconductor packages, that stores instructions executable by the processor core of the first semiconductor package, which when executed by the processor core of the first semiconductor package, cause the information handling system to:
configure a plurality of link registers, of the first semiconductor package, that configure the I/O communication fabric of the first semiconductor package to route communications of a plurality of components of the first semiconductor package to a plurality of inter-processor communication link interfaces of the first semiconductor package;

wherein the first semiconductor package includes a comparator and is configured to:
- communicate with a second semiconductor package of the plurality of semiconductor packages via the plurality of inter-processor communication link interfaces;
- determine a plurality of link utilization values respectively associated with the plurality of inter-processor communication link interfaces;
- store the plurality of link utilization values via a respective plurality of link utilization registers;
- monitor the plurality of link utilization values via the respective plurality of link utilization registers;
- determine that a link utilization value of the plurality of link utilization values is at or above a threshold value via the comparator comparing the link utilization value with the threshold value;
- in response to determining that the link utilization value of the plurality of link utilization values is at or above the threshold value, generate an interrupt request (IRQ);
- provide the IRQ to the processor core of the first semiconductor package;

wherein the processor core of the first semiconductor package is configured to:
- receive the IRQ;

wherein the instructions further cause the information handling system to:
- determine that communications of at least one component of the plurality of components are routed, by the I/O communication fabric, to a first inter-processor communication link interface of the plurality of inter-processor communication link interfaces; and
- in response to the processor core of the first semiconductor package receiving the IRQ, configure a link register of the plurality of link registers, associated with the at least one component of the plurality of components, that configures the I/O communication fabric to route communications of the at least one component of the plurality of components to a second inter-processor communication link interface of the plurality of inter-processor communication link interfaces.

2. The information handling system of claim 1, wherein the at least one component of the plurality of components includes the processor core of the first semiconductor package.

3. The information handling system of claim 1, wherein the at least one component of the plurality of components includes at least one I/O module.

4. The information handling system of claim 1, wherein, to configure the plurality of link registers, of the first semiconductor package, that configure the I/O communication fabric of the first semiconductor package to route communications of the plurality of components of the first semiconductor package to the plurality of inter-processor communication link interfaces of the first semiconductor package, the instructions further cause the information handling system to:
- configure a link register of the plurality of link registers associated with a first component of the plurality of components to utilize a first inter-processor communication link interface of the plurality of inter-processor communication link interfaces; and
- configure respective link registers associated with other components, other than the first component, of the plurality of components to utilize other inter-processor communication link interfaces, other than the first inter-processor communication link interface, of the plurality of inter-processor communication link interfaces.

5. The information handling system of claim 1, wherein, to monitor the plurality of link utilization values via the respective plurality of link utilization registers, the first semiconductor package is further configured to retrieve the plurality of link utilization values from the respective plurality of link utilization registers.

6. The information handling system of claim 1, wherein the plurality of processor cores includes at least one graphics processing unit.

7. The information handling system of claim 1, wherein at least one of the plurality of inter-processor communication link interfaces includes a plurality of serializers/deserializers.

8. The information handling system of claim 3, wherein the at least one I/O module includes at least one peripheral component interconnect express (PCIe) root complex.

9. The information handling system of claim 4, wherein the first component of the plurality of components includes a processor core of the plurality of processor cores.

10. A method, comprising:
- configuring a plurality of link registers, of a first semiconductor package of an information handling system, that configure an input/output (I/O) communication fabric of the first semiconductor package to route communications of a plurality of components of the first semiconductor package to a plurality of inter-processor communication link interfaces of the first semiconductor package;
- the first semiconductor package communicating with a second semiconductor package of the information handling system via the plurality of inter-processor communication link interfaces;
- determining a plurality of link utilization values respectively associated with the plurality of inter-processor communication link interfaces;
- storing the plurality of link utilization values via a respective plurality of link utilization registers;
- monitoring the plurality of link utilization values via the respective plurality of link utilization registers;
- determining that a link utilization value of the plurality of link utilization values is at or above a threshold value via a comparator comparing the link utilization value with the threshold value;
- in response to the determining that the link utilization value of the plurality of link utilization values is at or above the threshold value, generating an interrupt request (IRQ);
- providing the IRQ to a processor of the first semiconductor package;
- the processor of the first semiconductor package receiving the IRQ; and
- in response to the processor of the first semiconductor package receiving the IRQ, the processor of the first semiconductor package:
  - determining that communications of at least one component of the plurality of components are routed, by the I/O communication fabric, to a first inter-processor communication link interface of the plurality of inter-processor communication link interfaces; and configuring a link register of the plurality of link registers, associated with the at least one component of the plurality of components, that configures the I/O communication fabric to route communications of the at least one component of the plurality of components to a second inter-processor communication link interface of the plurality of inter-processor communication link interfaces.

11. The method of claim 10, wherein the at least one component of the plurality of components includes the processor.

12. The method of claim 10, wherein the at least one component of the plurality of components includes at least one I/O module.

13. The method of claim 10, wherein the configuring the plurality of link registers, of the first semiconductor package of an information handling system, that configure the I/O communication fabric of the first semiconductor package to route communications of the plurality of components of the first semiconductor package to the plurality of inter-processor communication link interfaces of the first semiconductor package includes:
configuring a link register of the plurality of link registers associated with a first component of the plurality of components to utilize a first inter-processor communication link interface of the plurality of inter-processor communication link interfaces; and
configuring respective link registers associated with other components, other than the first component, of the plurality of components to utilize other inter-processor communication link interfaces, other than the first inter-processor communication link interface, of the plurality of inter-processor communication link interfaces.

14. The method of claim 10, wherein the monitoring the plurality of link utilization values via the respective plurality of link utilization registers includes retrieving the plurality of link utilization values from the respective plurality of link utilization registers.

15. The method of claim 10, wherein at least one of the plurality of inter-processor communication link interfaces includes a plurality of serializers/deserializers.

16. The method of claim 10, wherein the plurality of components of the first semiconductor package includes at least one graphics processing unit.

17. The method of claim 12, wherein the at least one I/O module includes at least one peripheral component interconnect express (PCIe) root complex.

18. The method of claim 13, wherein the first component of the plurality of components includes a processor core.

19. An information handling system, comprising:
a plurality of semiconductor packages, each of the plurality of packages includes a plurality of processor cores and an input/output (I/O) communication fabric; and
a memory medium, coupled to a processor core of a first semiconductor package of the plurality of semiconductor packages, that stores instructions executable by the processor core of the first semiconductor package, which when executed by the processor core of the first semiconductor package, cause the information handling system to:
configure a plurality of link registers, of the first semiconductor package, that configure the I/O communication fabric of the first semiconductor package to route communications of a plurality of components of the first semiconductor package to a plurality of inter-processor communication link interfaces of the first semiconductor package, wherein to configure the plurality of link registers, the instructions further cause the information handling system to:
configure a link register of the plurality of link registers associated with a first component of the plurality of components to utilize a first inter-processor communication link interface of the plurality of inter-processor communication link interfaces; and
configure respective link registers associated with other components, other than the first component, of the plurality of components to utilize other inter-processor communication link interfaces, other than the first inter-processor communication link interface, of the plurality of inter-processor communication link interfaces;
wherein the first semiconductor package is configured to:
communicate with a second semiconductor package of the plurality of semiconductor packages via the plurality of inter-processor communication link interfaces;
determine a plurality of link utilization values respectively associated with the plurality of inter-processor communication link interfaces;
store the plurality of link utilization values via a respective plurality of link utilization registers;
monitor the plurality of link utilization values via the respective plurality of link utilization registers;
determine that a link utilization value of the plurality of link utilization values is at or above a threshold value;
in response to determining that the link utilization value of the plurality of link utilization values is at or above the threshold value, generate an interrupt request (IRQ);
provide the IRQ to the processor core of the first semiconductor package;
wherein the processor core of the first semiconductor package is configured to:
receive the IRQ;
wherein the instructions further cause the information handling system to:
determine that communications of at least one component of the plurality of components are routed, by the I/O communication fabric, to a first inter-processor communication link interface of the plurality of inter-processor communication link interfaces; and
in response to the processor core of the first semiconductor package receiving the IRQ, configure a link register of the plurality of link registers, associated with the at least one component of the plurality of components, that configures the I/O communication fabric to route communications of the at least one component of the plurality of components to a second inter-processor communication link interface of the plurality of inter-processor communication link interfaces.

20. A method, comprising:
configuring a plurality of link registers, of a first semiconductor package of an information handling system, that configure an input/output (I/O) communication fabric of the first semiconductor package to route communications of a plurality of components of the first semiconductor package to a plurality of inter-processor communication link interfaces of the first semiconductor package, wherein the configuring the plurality of link registers includes:

configuring a link register of the plurality of link registers associated with a first component of the plurality of components to utilize a first inter-processor communication link interface of the plurality of inter-processor communication link interfaces; and configuring respective link registers associated with other components, other than the first component, of the plurality of components to utilize other inter-processor communication link interfaces, other than the first inter-processor communication link interface, of the plurality of inter-processor communication link interfaces;

the first semiconductor package communicating with a second semiconductor package of the information handling system via the plurality of inter-processor communication link interfaces;

determining a plurality of link utilization values respectively associated with the plurality of inter-processor communication link interfaces;

storing the plurality of link utilization values via a respective plurality of link utilization registers;

monitoring the plurality of link utilization values via the respective plurality of link utilization registers;

determining that a link utilization value of the plurality of link utilization values is at or above a threshold value;

in response to the determining that the link utilization value of the plurality of link utilization values is at or above the threshold value, generating an interrupt request (IRQ);

providing the IRQ to a processor of the first semiconductor package;

the processor of the first semiconductor package receiving the IRQ; and in response to the processor of the first semiconductor package receiving the IRQ, the processor of the first semiconductor package:

determining that communications of at least one component of the plurality of components are routed, by the I/O communication fabric, to a first inter-processor communication link interface of the plurality of inter-processor communication link interfaces; and configuring a link register of the plurality of link registers, associated with the at least one component of the plurality of components, that configures the I/O communication fabric to route communications of the at least one component of the plurality of components to a second inter-processor communication link interface of the plurality of inter-processor communication link interfaces.

* * * * *